Aug. 21, 1928.
C. McNABB
1,681,777
EXTENSION HOOD FOR WIND STACKERS
Filed Oct. 12, 1925
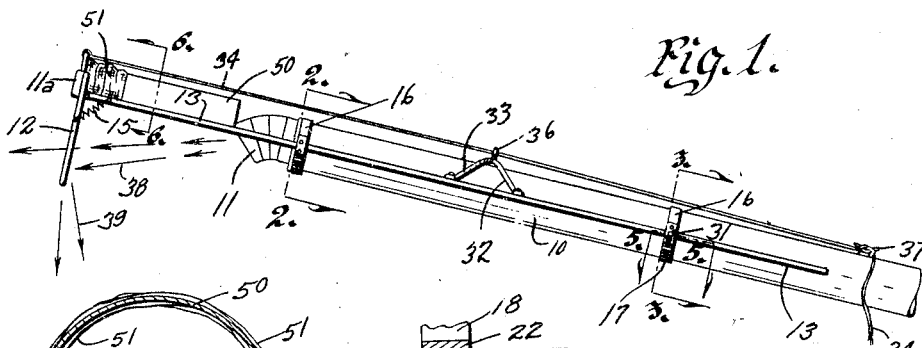
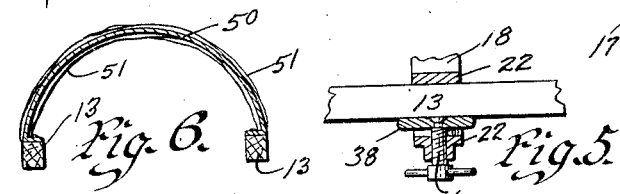
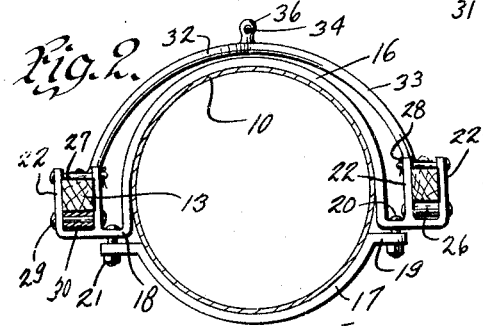
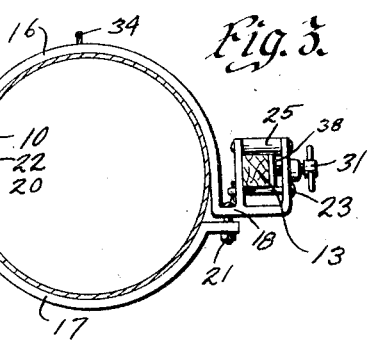
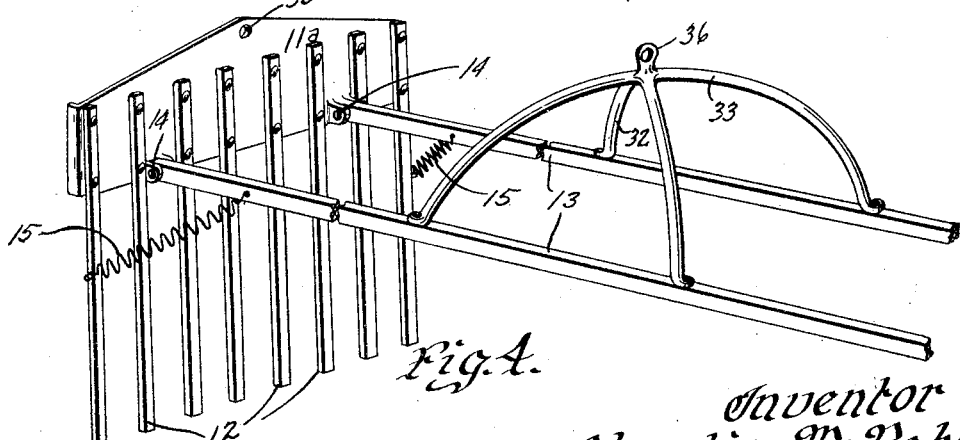
Inventor
Charlie McNabb
by Bair & Freeman Attorneys
Witness
Ray Rusher Patented Aug. 21, 1928.

1,681,777

UNITED STATES PATENT OFFICE.

CHARLIE McNABB, OF SCRANTON, IOWA.

EXTENSION HOOD FOR WIND STACKERS.

Application filed October 12, 1925. Serial No. 62,007.

My invention has to do with an attachment for wind stackers, which can be mounted on the wind stacker pipe and in combination with the pipe and hood may be adjusted to control the straw discharged from the wind stacker for making a better stack than has hitherto been possible.

More particularly, it is my object to provide an attachment which can be mounted on the wind stacker or easily removed therefrom and which when in use can be readily adjusted for controlling the discharge of straw effectively.

With these and other objects in view, my invention consists in the arrangement, construction and combination of the various parts of my extension hood for wind stackers, whereby the objects contemplated are attained, as hereinafter more fully set forth, pointed out in my claims, and illustrated in the accompanying drawings, in which:

Figure 1 shows a side elevation of a wind stacker equipped with an extension hood embodying my invention.

Figure 2 is a detail, transverse, sectional view taken on the line 2—2 of Figure 1.

Figure 3 is a similar view taken on the line 3—3 of Figure 1.

Figure 4 is a perspective view of my improved attachment, parts being broken away and parts being omitted.

Figure 5 is a detail, sectional view taken on the line 5—5 of Figure 1; and

Figure 6 is a detail, sectional view taken on the line 6—6 of Figure 1.

In the accompanying drawings, I have used the reference numeral 10 to indicate generally the pipe used in ordinary wind stackers for conveying straw from the separator to the stack.

The wind stacker pipe 10 is ordinarily provided with a hood 11.

Objection has been made to ordinary wind stackers for the reason that the deposit of straw could not be accurately enough controlled.

It is difficult with an ordinary wind stacker to arrange the straw in a symmetrical stack, which can be properly propped out in such a manner as to be less likely to become wet through with rains.

It is my purpose to provide in combination with the wind stacker, having the pipe 10 and ordinary hood 11, an attachment which can be readily mounted on or detached from the wind stacker, and which can be readily and easily adjusted for securing a much more accurate control of the piling of the straw than is otherwise possible.

My improved extension hood comprises a straw guide device, which may have various forms, but in the form here illustrated, comprises a cross plate 11$^a$, having projecting downwardly therefrom a plurality of spaced fingers 12.

Pivoted to the plate 11$^a$, preferably near the lower edge thereof are rigid arms 13 spaced from each other a sufficient distance to receive between them the pipe 10. These arms 13 are mounted on the pipe 10 for longitudinal adjustment. The fingers 12 then stand spaced in front of the pipe 10, and when the straw is discharged against them will cause it to drop downwardly, so that the arrangement of the straw on the stack can be better controlled.

The plate 11$^a$ is adjustable on the pivots 14 of the arms 13 by means hereinafter referred to, so as to regulate the angle of the fingers 12 with relation to the line of discharge of the straw from the hood 11.

Springs 15 connect some of the fingers 12 with the arms 13, as shown in Figures 1 and 4, for tending to pull the lower parts of the fingers toward the hood 11, and a means for adjusting the fingers against the tension of the springs is provided. This means will be later referred to.

I will now describe the manner of mounting the arms 13 on the pipe 10.

On the pipe 10, I mount spaced clamps, each comprising an upper clamp member 16 and a lower clamp member 17. These clamp members 16 and 17 have opposite flanges 19 connected by suitable bolts and nuts 20 and 21.

The upper flange 18 of each of the clamp devices projects laterally and has spaced upwardly projecting bracket fingers 22. Extended between the bracket fingers 22 on each side of the rear clamp near the lower ends of the fingers is a removable bolt 23 held in place by a cotter pin or the like 24.

Mounted between the upper ends of each rear pair of fingers 22 is a suitable roller 25. Mounted between the lower parts of each forward pair of fingers 22 is a roller 26. Bolts 27 are mounted in the upper parts of each forward pair of fingers 22, as shown in Figure 2, and are held in place by cotter pins 28, or the like.

The rollers 25 and 26 in each instance comprise a spindle or the like 29 on which is a roller sleeve 30, as shown at the right-hand side of Figure 2.

The pair of fingers 22 on one side of the rear bracket are spaced apart a little farther than are the members of the other pairs of fingers 22, and in the outer one of said more widely spaced fingers 22 is mounted a set screw or the like 31.

The arms 13 are extended between the respective pairs of fingers 22 and between the rollers 26 and bolts 27 and between the rollers 25 and bolts 23.

It will be seen that the arms 13 may be slid longitudinally and that their weight rests on the rollers 26 at the lower parts of the forward fingers 22 and against the rollers 25 at the upper parts of the rearward fingers 22.

The set screw 31 is used for locking one of the arms 13 in various positions of the longitudinal adjustment of said arms.

To further more satisfactorily support the arms 13 on the pipe 10, I connect the arms 13 by curved, diagonal brace members 32 and 33 connected at their common center, as shown in Figure 4. This brace structure, made up of the members 32 and 33, rests on top of the pipe 10.

When the attachment has been installed on the wind stacker pipe 10, a flexible member 34 is fastened to the upper, central part of the plate 11ª as through the hole 35, and is then extended rearwardly along the top of the pipe 10, preferably through a point 36 formed where the braces 33 and 32 cross each other, and thence to a fastening member 37 on the pipe 10.

By drawing the rope or flexible member 34 taut against the tension of the springs 15, the fingers 12 may be adjusted at various angles with relation to the arms 13, as will be obvious from an examination of the drawings.

The inner end of the set screw 31 may be provided with a wear plate 38 to bear against the adjacent arm 13 as illustrated in Figures 3 and 5.

In the actual use of my improved extension hood for wind stackers, the arms 13 are mounted between the respective pairs of fingers 22 and are adjusted longitudinally for arranging the fingers 12 at the proper distance from the hood 11 and are then locked by means of the set screw 31.

It will be seen that the attachment may then be swung up or down or laterally with the pipe 10 and hood 11.

The rope 34 may be drawn tight enough to incline the fingers 12 away from the hood 11 at such an angle as to cause the fingers 12 to be practically ineffective.

On the other hand, by loosening the rope 34 and permitting the springs 15 to draw the lower parts of the fingers 12 toward the hood 11, the angle of said fingers with relation to the arms 13 may be varied as desired for causing the straw to be blown against the fingers and to then drop downwardly according to the conditions desired in any particular stacking job.

The fingers 12 may be arranged so as to cause the stack to drop practically straight downwardly or to permit it to slide at the desired angle.

In Figure 1, I have shown the arrows 38 indicating the direction of the blast of air and the straw from the hood to the fingers 12 and have shown the arrows 39 indicating the direction of the dropping of the straw after it strikes the fingers 12.

By using the spaced fingers 12, it is obvious that the air may pass the fingers freely, even though the fingers stop the straw.

The longitudinal adjustment of the arms 13 on the pipe 10 and the angular adjustment of the fingers 12 with relation to the arms 13 permits such a variety of arrangements for the attachment as makes it possible to very largely and accurately control the dropping of the straw on the stack.

With a device of this kind, it will be seen that the stack can be built much more symmetrically than would otherwise be possible, and this makes it possible to make a stack, which will stand better against the wind, and which can be built to withstand moisture much better than the stack built with an ordinary wind stacker.

It will be seen that by removing the pins 27 and 23, the arms 13 may be lifted from between the forward fingers 22 and then slid from between the rearward pairs of finers 22, and the device, except for the clamps, may thus be easily taken off the wind stacker for storage during the winter months or where it is not desired to use the attachment.

Preferably, I provide a metal hood 50 or the like supported on the forward parts of the arms 13 to keep the chaff and light straw from blowing upwardly or scattering. The forward end of the hood 50 is connected with the plate 11ª by a collapsible hood section 51 of canvas or any suitable material and construction for permitting free pivotal movement of the plate 11ª on the pivots 14.

Changes may be made in the details of the structure and the arrangement of the parts of my improved device without departing from the real spirit and purpose of my invention, and it is my intention to cover by my claims, any modified forms of structure or use of mechanical equivalents, which may be reasonably included within the scope of such claims.

I claim as my invention:

1. In a device of the class described, the combination of a wind stacker pipe, clamp devices mounted thereon in positions spaced from each other longitudinally of the pipe, pairs of spaced bracket fingers on the opposite sides of said clamp devices, rollers between the forward pairs of fingers near the lower parts thereof, rollers between the rearward pairs of fingers between the upper parts thereof, arms slidably mounted between the pairs of fingers on the opposite sides of the pipe, and means for locking said arms in different positions of their longitudinal adjustment on said clamps, a cross plate pivoted to the forward ends of said arms, spaced fingers on said cross plate, yielding means for connecting some of said fingers with said arms, for tending to move the fingers toward one limit of their pivotal adjustment, and a flexible member connected with said plate for moving the fingers against the tension of the yielding means.

2. In a device of the class described, the combination of a wind stacker pipe, clamp devices mounted thereon in positions spaced from each other longitudinally of the pipe, pairs of spaced bracket fingers on the opposite sides of said clamp devices, rollers between the forward pairs of fingers near the lower parts thereof, rollers between the rearward pairs of fingers between the upper parts thereof, arms slidably mounted between the pairs of fingers on the opposite sides of the pipe, and means for locking said arms in different positions of their adjustment on said clamps, a cross plate pivoted to the forward ends of said arms, spaced fingers on said cross plate, yielding means for connecting some of said fingers with said arms, for tending to move the fingers toward one limit of their pivotal adjustment, and a flexible member connected with said plate for moving the fingers against the tension of the yielding means, and a supporting means connecting said arms and extending over said pipe.

3. In a device of the class described, a wind stacker pipe, clamp devices detachably mounted in spaced relation thereon, guide members carried by said clamp devices, arms slidably mounted in the guide devices on opposite sides of the pipe and projecting forwardly from the pipe, a straw guiding device pivoted to the forward ends of said arms, an upwardly arched hood carried by the portions of said arms which project beyond the pipe, said hood terminating short of said straw guiding device and a flexible upwardly arched hood connecting said first hood to said pivoted straw guiding device.

Des Moines, Iowa, September 29, 1925.

CHARLIE McNABB.